United States Patent [19]
Vanlautem et al.

[11] 3,994,969
[45] Nov. 30, 1976

[54] PROCESS FOR THE MANUFACTURE OF SALTS OF POLY-ALPHA-HYDROXYACRYLIC ACIDS

[75] Inventors: Noël Vanlautem, Brussels; Julien Mulders, Dworp, both of Belgium

[73] Assignee: Solvay & Cie, Brussels, Belgium

[22] Filed: Apr. 23, 1975

[21] Appl. No.: 571,006

[30] Foreign Application Priority Data
Apr. 30, 1974 Luxembourg............................ 69969

[52] U.S. Cl............................................. 260/535 P
[51] Int. Cl.$^2$.......................................... C07C 59/17
[58] Field of Search ...................... 260/486, 535 P

[56] References Cited
UNITED STATES PATENTS
3,706,672  12/1972  Martin................................ 260/535

Primary Examiner—Paul J. Killos
Attorney, Agent, or Firm—Spencer & Kaye

[57] ABSTRACT

A process is provided for the manufacture of salts of poly-alpha-hydroxyacrylic acids, which salts contain monomeric units of the formula

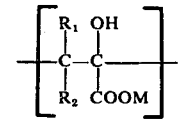

wherein $R_1$ and $R_2$ independently represent hydrogen or an alkyl group containing 1 to 3 carbon atoms and wherein M represents a cationic radical resulting from the dissociation of a base. A solid polylactone derived from the corresponding poly-alpha-hydroxyacrylic acid is reacted with the base in the presence of water and the reaction is carried out in a liquid medium containing a diluent so that the polyacetone and the salt produced do not dissolve in the medium.

10 Claims, No Drawings

PROCESS FOR THE MANUFACTURE OF SALTS OF POLY-ALPHA-HYDROXYACRYLIC ACIDS

BACKGROUND OF THE INVENTION

The present invention relates to a process for the manufacture of salts of poly-alpha-hydroxyacrylic acids which can be used as sequestering agents for metal ions and as builders in detergents, as described in Belgian Pat. No. 776,705 of Dec. 15, 1971 in the name of Solvay & Cie. which is hereby incorporated by reference.

The known methods for the manufacture of these products are generally based on the preparation of an intermediate which is the polymer derived from the corresponding alpha-chloroacrylic acid. They comprise a step involving the hydrolysis of this polymer which, whether or not it has been isolated from the formation medium, is in the form of a gel which is insoluble in water. This polymer is the polylactone derived from the poly-alpha-hydroxyacrylic acid.

In the past, this polylactone has been treated with an aqueous solution of a hydroxide to give the desired salt in the form of a solution in the reaction medium. The poly-alpha-hydroxyacrylic thus prepared is then isolated from its aqueous solution, for example, by evaporation of the water or by precipitation by means of methanol, such as described in Belgian Pat. No. 786,464 of July 19, 1972 in the name of Solvay & Cie.

These processes for isolating the poly-alpha-hydroxyacrylate from its aqueous solution are all difficult to carry out. Thus, the removal of water by evaporation involves the use of complicated equipment and, moreover, this operation requires a great deal of heat because the amounts of water to be removed are very large. The precipitation of the polymer from its solution by means of a non-solvent such as methanol also presents numerous difficulties. For example, when precipitating from a very concentrated polymer solution, the solution of polymer sets solid to give a kind of gum, or when precipitating from a slightly concentrated solution of polymer, a very fine powder is obtained which is very difficult to filter off. It is thus necessary to make a prior readjustment of the concentration of the aqueous solution by dilution or by reconcentration, depending on the particular cases. Moreover, the amounts of nonsolvent to be employed are very large.

SUMMARY OF THE INVENTION

There has now been discovered, in accordance with the present invention, a process for the direct manufacture of salts of poly-alpha-hydroxyacrylic acids starting from the corresponding polylactones, which does not possess the above-mentioned disadvantages.

The present invention, as embodied and broadly described, provides an improved process for the manufacture of salts of poly-alpha-hydroxyacrylic acids which salts contain monomeric units of the formula

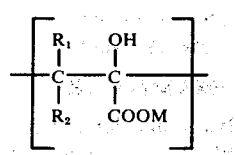

wherein $R_1$ and $R_2$ independently represent hydrogen or an alkyl group containing 1 to 3 carbon atoms and wherein M represents a cationic radical resulting from the dissociation of a base, and which salts are produced by reacting the base, in the presence of water, with a solid polylactone derived from the corresponding poly-alpha-hydroxyacrylic acid. The improvement provided by the present invention comprises carrying out the reaction in a liquid medium containing a diluent so that the polylactone and the salt produced do not dissolve in the medium.

It is to be understood that both the foregoing general description and the following detailed description are exemplary, but are not restrictive of the invention.

DETAILED DESCRIPTION OF THE INVENTION

The salts obtained according to the process of the present invention can be salts of homopolymeric or copolymeric poly-alpha-hydroxyacrylic acids. Their average molecular weight is at least equal to 300. It is generally between 2,000 and 1,000,000. Most frequently, the average molecular weight of the salts is between 5,000 and 800,000.

The process of the present invention can be applied particularly well to the manufacture of salts of homopolymeric poly-alpha-hydroxyacrylic acids. The process of the present invention, however, can also be used for the preparation of salts of copolymers of alpha-hydroxyacrylic acids with other monomers of the vinyl type which are substituted by one or more groups selected from the group consisting of hydroxyl and carboxyl groups.

Monomeric units of the vinyl type of the formula

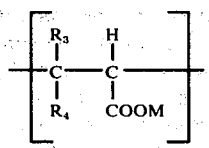

wherein $R_3$ and $R_4$ independently represent a hydrogen atom or an alkyl group containing 1–3 carbon atoms and wherein M has the same meaning as in formula I above, can advantageously be present in the copolymers. The salts of copolymers prepared according to the process of the invention preferably contain at least 50 mol % of alpha-hydroxyacrylate monomeric units as defined in formula I above and, more particularly, at least 65 mol % of such units. Salts of copolymers which it is of particular value to prepare according to the process of the invention are salts of copolymers of unsubstituted acrylic acid with alpha-hydroxyacrylic acids.

The process of the present invention can be applied very particularly to the manufacture of salts of poly-alpha-hydroxy-acrylic acids for which $R_1$ and $R_2$ represent hydrogen or a methyl group, it being possible for $R_1$ and $R_2$ to be identical or different. The best results are obtained in the manufacture of salts of unsubstituted poly-alpha-hydroxyacrylic acids, and, more particularly, in the manufacture of salts of homopolymeric unsubstituted poly-alpha-hydroxyacrylic acids.

The solid polyactones used as starting products in the process of the present invention are inter- and intramolecular esters of the corresponding poly-alpha-hydroxyacrylic acids. In these polylactones, approximately 30 to 100%, and generally 40 to 100%, of the acid groups of the alpha-hydroxyacrylic monomeric units are esterified by alcohol groups.

These polylactones are most frequently products resulting from the hydrolysis of the polymers derived from corresponding alpha-chloroacrylic acids. They can especially be prepared by homo- or co-polymerization and hydrolysis of alph-chloroacrylic acids, it being possible for the latter optionally to be prepared in situ by dehydrochlorination of alpha-beta-dichloropropionic acids. Such processes for the preparation of polylactones are described especially in Belgian Pat. Nos. 817,678 and 817,679 of July 15, 1974 in the name of Solvay & Cie. which patents are hereby incorporated by reference. It is also possible to prepare these polylactones by halogenation and hydrolysis of polyacrylic acids. A process of this type is described in published German Pat. No. 2,211,256 of Mar. 9, 1972 in the name of KNAPSACK A. G. which is hereby incorporated by reference.

Among all these known processes, the process described in the above Belgian Pat. No. 817,679 has proved particularly advantageous for the preparation of the polylactones used in the process of the invention. The solid polylactones obtained in accordance with the process described in Belgian Pat. No. 817,679 can be isolated from their formation medium, by any method which is in itself known and especially by filtration or centrifuging, before they are used. They can be used either in the wet state or after drying. If the polylactones are used in the wet state, the amount of water which has to be introduced into the reactor for the formation of the desired salts is, of course, reduced by the amount of water retained by the wet polylactone.

The base employed to react with the polylactones in the process of the present invention can be any organic or inorganic base. Generally, the amount of base used is the stoichiometrical amount. Advantageously, an alkali metal hydroxide or ammonium hydroxide or a nitrogen-containing organic base can be used. The nitrogen-containing organic base can be of the aliphatic type possessing a nitrogen atom substituted by one or more alkyl groups which contain 1 to 6 carbon atoms and which can be substituted. Mono- and diethanolamine may be mentioned as examples of a nitrogen-containing organic base which can be used in the present invention. The nitrogen-containing organic base can also be of the alicyclic or aromatic type and may or may not contain the nitrogen atom in the ring. Alkali metal hydroxides and ammonium hydroxide are very particularly suitable, the hydroxide most frequently used being sodium hydroxide.

The process which forms the subject of the present invention is thus advantageously applied to the manufacture of sodium salts of poly-alpha-hydroxyacrylic acids, and especially poly- (sodium alpha-hydroxyacrylates).

The base can be introduced into the reaction medium either directly or after it has been dissolved in water or in the diluent. Most frequently, the base will be dissolved in water before being introduced into the reactor.

The diluent used in the practice of the present invention can be any diluent which, in the form of a mixture with suitable amounts of water, does not dissolve either the polylactone or the salt which it is desired to prepare. The nature of the diluent and the amounts of diluent used are chosen so that the solubilities of the polylactone and of the salt obtained are each less than 2% by weight relative to the weight of the water/diluent liquid medium under the working conditions. The diluent can advantageously be chosen from among alcohols. As alcohols, aliphatic alcohols containing 1 to 5 carbon atoms can especially be used. Among these alcohols, methanol has proved to be particularly advantageous.

In order to carry out the process according to the invention, the starting polylactone will generally be suspended in the water/diluent medium before it is reacted with the hydroxide. Other processes can also be suitable. It is thus possible, for example, to introduce the polylactone into the water/diluent/base medium.

The amount of diluent used in such that, after introducing the total amount of water employed, the amount of water in the liquid medium is between 10 and 60% by weight of the total amount of the liquid medium.

The reaction with the base is advantageously carried out at the boiling point of the liquid medium at the reaction pressure, because it is thus possible to get rid of the heat of the reaction and to control the temperature by adjusting the pressure. Lower temperatures can also be used. Thus, it is possible to use temperatures between ambient temperature and the boiling point of the reaction medium, and especially, between 15° and 150° C. The reaction pressure is not critical. Pressures equal to, less than or greater than atmospheric pressure can be used. Pressures between 0.5 and 5 kg/cm$^2$ are preferred for reasons of convenience.

The use of a water/diluent liquid medium which does not dissolve either the polylactone or the salt, as the reaction medium, proves to be particularly advantageous. In fact, the salt obtained, which remains suspended in the water/diluent liquid medium, can be isolated easily from the medium by means of any method which is in itself known such as, for example, filtration or centrifuging, without requiring prior precipitation which is particularly difficult to carry out.

Moreover, the amount of diluent to be employed is surprisingly very low by comparison with the amount of non-solvent necessary to effect the precipitation of equivalent amounts of salts from their aqueous solutions in the known processes. The steps involving purification and recycling of the diluent are thus greatly simplified.

Finally, the process can be used no matter what the quantity of polylactone suspended in the liquid mixture may be. It is thus possible to obtain mixtures which can contain up to 50% by weight of salt relative to the total weight. Lower proportions of salt can, of course, be considered, but are less valuable economically, while at higher proportions, the suspensions become difficult to handle. The amount of dry polylactone suspended in the liquid mixture is usually between 0.1 and 50 % by weight and more generally between 1 and 35 % by weight of the total weight of the reaction medium.

The following examples illustrate the present invention and are in no way limiting.

The first example is driven by way of comparison in order to demonstrate the problems encountered when using the known processes for the manufacture of salts of poly-alpha-hydroxyacrylic acids.

EXAMPLE 1R 120 g of dry polylactone derived from poly-alpha-hydroxyacrylic acid were suspended in 2 liters of water and this suspension was treated with approximately 170 cm$^3$ of a 10N aqueous solution of NaOH. The solution obtained was poured into methanol and a solid was obtained which was filtered off, washed with 3 liters of methanol and finally dried. 179 g of poly(sodium alpha-hydroxyacrylate) were thus obtained, which is equivalent to a yield of 95%. The amount of methanol necessary for precipitation was 4 liters, corresponding to 22.3 liters for 1 kg of poly-(sodium alpha-hydroxyacrylate), without taking into account the amount necessary for washing the precipitate.

EXAMPLE 2

100 g of wet polylactone derived from poly-alpha-hydroxyacrylic acid and containing 16 g of dry product were suspended in 159 g of methanol to which 20 cm$^3$ of a 1ON aqueous solution of sodium hydroxide were added, with stirring, over the course of 20 minutes. The resulting reaction mixture was heated under reflux for 1 hour, filtration was effected and the filtrate, which consisted of poly-(sodium alpha-hydroxyacrylate), was dried. The yield was quantitative.

The amount of methanol necessary to prepare 1 kg of solid poly-(sodium apha-hydroxyacrylate) was thus 8 liters.

EXAMPLE 3

14 g of dry polylactone derived from poly-alpha-hydroxyacrylic acid were suspended in 50 g of ethanol and 30 g of water. The mixture was heated under reflux for 1 hour and 20 cm$^3$ of a 1ON aqueous solution of sodium hydroxide were added simultaneously, with stirring, over the course of 20 minutes. Filtration was effected and the filtrate, which consisted of poly-(sodium alpha-hydroxyacrylate), was dried. The yield was quantitative.

The amount of ethanol necessary to prepare 1 kg of solid poly-(sodium alpha-hydroxyacrylate) was thus 2.9 liters.

EXAMPLE 4

The procedure of Example 3 was repeated, except that the 50 g of ethanol were replaced by 50 g of methanol. The result obtained was identical.

EXAMPLE 5

14 g of dry polylactone derived from poly-alpha-hydroxyacrylic acid were suspended in 70 g of methanol and 30 g of water. The mixture was heated under reflux for 1 hour and 20 cm$^3$ of a 1ON aqueous solution of sodium hydroxide were added simultaneously, with stirring, over the course of 20 minutes. Filtration was effected and the filtrate, which consisted of poly-(sodium alpha-hydroxyacrylate) was dried. The yield was quantitative.

The amount of methanol necessary to prepare 1 kg of solid poly-(sodium alpha-hydroxyacrylate) was thus 4 liters.

EXAMPLE 6

50 g of methanol, 30 g of water and 20 cm$^3$ of an aqueous solution of sodium hydroxide were introduced into a 250 cm$^3$ flask. The mixture was heated at 40° C and 14 g of the polylactone derived from poly-alpha-hydroxyacrylic acid were added all at once. The resulting reaction mixture was then heated under reflux for 1 hour. Poly-(sodium alpha-hydroxyacrylate) was obtained in quantitative yield.

The amount of methanol necessary to prepare 1 kg of a solid poly-(sodium alpha-hydroxyacrylate) was thus 2.9 liters.

EXAMPLE 7

The procedure of Example 6 was repeated, except that the 50 g of methanol were replaced by 50 g of ethanol. The result obtained was identical.

EXAMPLE 8

35 g of methanol, 11 g of water and 24 cm$^3$ of a 1ON aqueous solution of sodium hydroxide were introduced into a 250 cm$^3$ flask. The mixture was heated at 40° C and 17 g of the polylactone derived from poly-alpha-hydroxyacrylic acid were added. The resulting reaction mixture was then heated under reflux for 1 hour. Poly-(sodium alpha-hydroxyacrylate) was obtained in quantitative yield.

The amount of methanol necessary to prepare 1 kg of polyalpha-hydroxyacrylate was thus 1.7 liters.

Examination of Examples 2 to 8, carried out according to the present invention, shows that it is possible to use particularly small amounts of diluent, which can be as little as approximately 1.7 liters of diluent per kilogram of polyalpha-hydroxyacrylate, while, according to the known process described in the reference Example 1R, it was necessary to use 22.3 liters of non-solvent in order to precipitate 1 kg of poly-alpha-hydroxyacrylate.

It will be understood that the above description of the present invention is susceptible to various modifications, changes and adaptations, and the same are intended to be comprehended within the meaning and range of equivalents of the appended claims.

What is claimed is:

1. In a process for the manufacture of salts of poly-alpha-hydroxyacrylic acids, which salts contain monomeric units of the formula

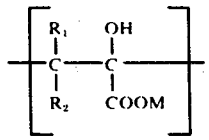

wherein R$_1$ and R$_2$ independently represent hydrogen or an alkyl group containing 1 to 3 carbon atoms and wherein M represents a cationic radical resulting from the dissociation of a base, and which salts are produced by reacting the base, in the presence of water, with a solid polylactone derived from the correspoding poly-alpha-hydroxyacrylic acid, the improvement wherein the reaction is carried out in a liquid medium comprising water and a diluent, the diluent being one which does not dissolve the polylactone and the salt produced and being present in quantities such that the solubility of the polylactone and that of the salt produced are each less than 2% by weight relative to the weight of the water-diluent liquid mixture.

2. Process according to claim 1, wherein the diluent is an alcohol.

3. Process according to claim 2, wherein the diluent is selected from the group consisting of aliphatic alcohols containing 1 to 5 carbon atoms and their mixtures.

4. Process according to claim 3 wherein the diluent is methanol.

5. Process according to claim 1, wherein the amount of water employed in the liquid medium is between 10 and 60% by weight.

6. Process according to claim 1, wherein the base contains an ammonium radical or alkali metal radical as the cationic radical so that there is formed alkali metal salts or ammonium salts of poly-alpha-hydroxyacrylic acids.

7. Process according to claim 1, wherein the polylactone is homopolymeric so that salts of homopolymeric poly-alpha-hydroxyacrylic acids are produced.

8. Process according to claim 7, wherein the base contains an ammonium radical or alkali metal radical as the cationic radical so that there is formed alkali metal salts or ammonium salts of poly-alpha-hydroxyacrylic acids.

9. Process according to claim 1, wherein the base contains sodium as the cationic radical so that there is formed sodium salts of poly-alpha-hydroxyacrylic acids.

10. Process according to claim 1 wherein the base contains sodium as the cationic radical and the polylactone is a polylactone derived from poly-alpha-hydroxyacrylic acid so that poly-(sodium alpha-hydroxyacrylate) is produced.

* * * * *